(12) United States Patent
Lewis et al.

(10) Patent No.: US 6,271,899 B1
(45) Date of Patent: *Aug. 7, 2001

(54) TUNABLE NANO-PHASE POLYMER DISPERSED LIQUID CRYSTAL FILTER

(75) Inventors: Keith L Lewis; Ian R Mason; Ian C Sage; Richard S Blacker, all of Malvern (GB)

(73) Assignee: The Secretary of State for Defence in Her Brittanic Majesty's Government of the United Kingdom of Great Britain and Northern Ireland, Farnborough (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/171,350
(22) PCT Filed: Apr. 9, 1997
(86) PCT No.: PCT/GB97/00980
§ 371 Date: Oct. 16, 1998
§ 102(e) Date: Oct. 16, 1998
(87) PCT Pub. No.: WO97/40420
PCT Pub. Date: Oct. 30, 1997

(30) Foreign Application Priority Data

Apr. 25, 1996 (GB) .................................................. 9608636

(51) Int. Cl.⁷ .................................................. G02F 1/1333
(52) U.S. Cl. .................................................. 349/86; 349/198
(58) Field of Search .................................................. 349/198, 114, 349/74, 86; 252/299.01

(56) References Cited

U.S. PATENT DOCUMENTS

| | | | |
|---|---|---|---|
| 4,779,959 | * 10/1988 | Saunders | 349/198 |
| 4,869,847 | * 9/1989 | Leslie et al. | 252/299.01 |
| 5,068,749 | * 11/1991 | Patel | 349/198 |
| 5,132,824 | * 7/1992 | Patel et al. | 349/1 |
| 5,150,236 | * 9/1992 | Patel | 349/198 |
| 5,592,314 | * 1/1997 | Ogasawara et al. | 349/74 |

FOREIGN PATENT DOCUMENTS

| | | |
|---|---|---|
| 0 260 073 A | 3/1988 | (EP) . |
| 0 282 963 A | 9/1988 | (EP) . |
| WO 92 04653 A | 3/1992 | (WO) . |

OTHER PUBLICATIONS

IEEE Photonics Technology Letters, vol. 4, No. 6, Jun. 1, 1992, pp. 597–599, XP000275547 Katsuhiko Hirabayashi et al: "Tunable wavelength–selective liquid crystal filters for 600–channel FDM systems" see the whole document.

Journal Of Applied Physics, vol. 67, No. 9, May 1, 1990, pp. 4253–4259, XP002035040 M.J. Sansone et al. "Large Kerr effects in transparent encapsulated liquid crystals" see the whole document.

"Large Electrooptic Modulation Using Ferroelectric Thin Films In a Fabry–Perot Cavity", Feiling Wang & Gene H. Haertling, Proc.. of the Ninth IEEE Int. Symp. On Applns of Ferroelectrics (ISAF), University Park, PA, Aug. 7–10, 1994, Symp. 9 pp. 683–686.

* cited by examiner

Primary Examiner—James A. Dudek
(74) Attorney, Agent, or Firm—Nixon & Vanderhye P.C.

(57) ABSTRACT

A tunable filter in particular for use in the visible or near infrared wavelength region, comprising a nano dispersed composite material contained within a resonant cavity structure comprising dielectric mirrors (15, 16), where the material is polarizable by means of an applied electric field. In particular, the polarizable material may be a nano phase polymer dispersed liquid crystal (PDLC) material where the diameter of liquid crystal droplets (2) within the material (3) is less than 0.1 μm, and for use in the visible wavelength region is typically between 10 nm and 50 nm. The filter also comprises structure for applying a variable electric field across the faces of the material. The transmission-wavelength characteristic of the filter is such that maxima and minima are shifted in wavelength by varying the electric field.

42 Claims, 5 Drawing Sheets

TUNABLE NANO-PHASE POLYMER DISPERSED LIQUID CRYSTAL FILTER

BACKGROUND OF THE INVENTION

1. Field of the Invention

The invention relates to a tuneable filter, in particular for use in the visible or near infrared wavelength regions. The filter may be used, for example, in protection against laser radiation, or as a high contrast tuneable filter for display purposes. The filter may also be used for wavelength division multiplexing in telecommunications applications.

2. Discussion of Prior Art

In a conventional tuneable filter based on a Fabry Perot etalon, the cavity length may be varied in order to tune the filter to the required wavelength. This may be done by mechanically varying the cavity length, using piezoelectric drivers attached to the glass substrates at the end of the cavity. Temperature tuning techniques may also be employed, using thermo-optic effects in the material contained within the cavity. Alternatively the cavity can be tuned to a particular wavelength by varying the angle at which light is incident on the filter.

Tuneable filters may be particularly useful as a means of protecting against laser radiation, especially where the precise laser wavelength is unknown. A suitable protective device for any optical imaging system or detection system (including the human eye) must transmit in-band wavelengths so that vision or detection is not significantly obscured even when activated.

SUMMARY OF THE INVENTION

The present invention relates to a tuneable filter and active material which is operable in the visible or near infrared regions. As the filter is transparent to visible and near infrared wavelengths in all operating states it does not significantly obscure vision and may therefore be incorporated within imaging equipment or viewing aids, such as a pair of binoculars.

The following prior art documents describe background art to the present invention; Feiling Wang and Gene H. Haertling, "Large Electrooptic Modulation Using Ferroelectric Thin Films . . . ", Proc. of the Ninth IEEE Int. Symp. on Applications of Ferroelectrics (ISAF), University Park, Pa., Aug. 7–10, 1994, Symp. 9 pp. 683–686 and EP 282 963 A.

According to the invention, a tuneable filter having a transmission-wavelength characteristic with at least one maximum or minimum comprises;

a nano phase polymer dispersed liquid crystal (PDLC) material contained within and forming part of a resonant cavity, wherein said material is polarisable by means of an applied electric field, at least one layer of dielectric material on each side of the nano phase PDLC material, said dielectric material having a refractive index different from that of the nano phase PDLC material and means for applying a variable electric field across the nano phase PDLC material, wherein variation of the electric field applied across the nano phase PDLC material gives rise to variation of the wavelengths at which the maximum or minimum occurs in the transmission-wavelength characteristic.

The liquid crystal material may be a nematic material. Preferably the droplets of liquid crystal material within the PDLC material have a diameter within the range of 10 nm and 50 nm.

In a further preferred embodiment, the resonant cavity has substantially parallel, facing input and output glass substrates.

The transmission-wavelength characteristic of the filter may have a plurality of maxima and minima. For a tuneable filter operable in the visible or near infrared wavelength region, at least one maximum or minimum is in the visible or near infrared wavelength region.

According to the invention, a tuneable filter comprises;

a nano dispersed composite material contained within and forming part of a resonant cavity, wherein said material is polarisable by means of an applied electric field and has a transmission-wavelength characteristic with at least one maximum or minimum;

at least one layer of dielectric material on each side of the nano dispersed composite material, said dielectric material having a refractive index different from that of the nano dispersed composite material and means for applying a variable electric field across the nano dispersed composite material wherein variation of the electric field applied across the nano dispersed composite material gives rise to variation of the wavelengths at which the maximum or minimum occurs in the transmission-wavelength characteristic.

The nano dispersed composite material may be a nano phase polymer dispersed liquid crystal (PDLC) material.

The liquid crystal material may be a nematic material. For use of the filter in a wavelength region including a wavelength $\lambda$, droplets of liquid crystal material within the PDLC material may have a diameter of between $0.02\lambda$ and $0.12\lambda$. Typically, the droplets of liquid crystal material within the PDLC material have a diameter of less than 0.1 $\mu$m. For use of the filter in the visible wavelength region, the droplets of liquid crystal material may typically have a diameter of between 10 nm and 50 nm.

In a preferred embodiment, the resonant cavity has substantially parallel, facing input and output substrates which may typically be glass substrates.

The transmission-wavelength characteristic of the filter may have a plurality of maxima and minima. For a tuneable filter operable in the visible or near infrared wavelength region, at least one maximum or minimum is in the visible or near infrared wavelength region.

Some of the layers of dielectric material may be indium tin oxide (ITO). The ITO layers may conveniently be coated on the inward facing surfaces of the input and output substrates such that the ITO layers form electrodes to which the electric field is applied.

The filter may also comprise at least one other layer of dielectric material on either side of the polarisable material for enhanced spectral contrast, said layers being contained within and substantially parallel to the facing substrates. Preferably, the filter comprises layers of dielectric material of high (H) and low (L) refractive index, contained within the facing substrates in an alternate HL layer structure. For example, the material of high refractive index may be titanium oxide ($TiO_2$) and the material of low refractive index may be silicon oxide ($SiO_2$).

The filter may comprise alternate layers of ITO and polarisable material, said layers being contained within and substantially parallel to the input and output facing substrates. The filter may further comprise means for applying a separate voltage to each individual ITO layer.

BRIEF DESCRIPTION OF THE DRAWINGS

The invention will now be described, by example only, with reference to the following figures in which.

DETAILED DISCUSSION OF PREFERRED EMBODIMENTS

Figure 1A:
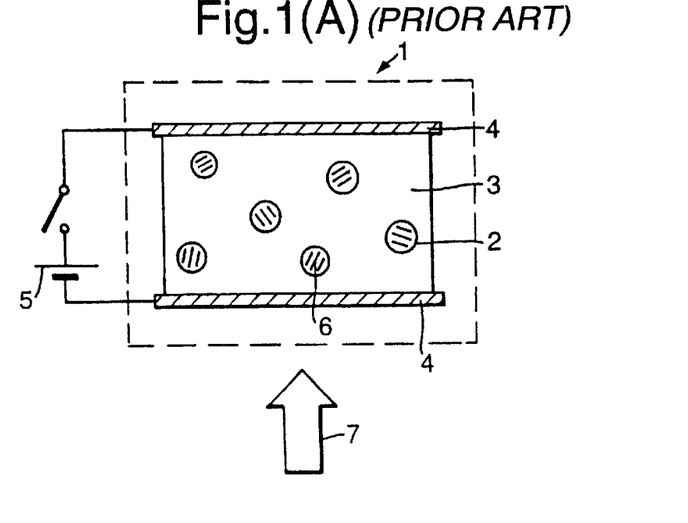
FIGS. 1(a) and 1(b) show diagrams of a polymer dispersed liquid crystal (PDLC) cell comprising a PDLC material, with and without a voltage applied across the PDLC material.
Figure 1B:
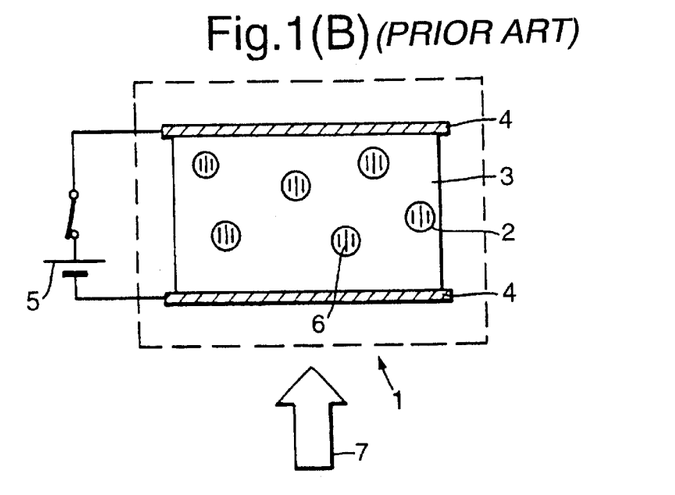

Referring to FIG. 1, a polymer dispersed liquid crystal (PDLC) cell 1 comprises a polymer dispersed liquid crystal material contained between two substantially parallel facing substrates 4. The PDLC material comprises droplets of liquid crystal material 2 dispersed in a polymer matrix 3. The substrates 4, usually glass substrates, are coated with a suitable dielectric material (not shown) to form electrodes which enable a voltage 5 to be applied across the cell. Typically, the dielectric material may be indium tin oxide (ITO) or any other transparent dielectric material.

In the conventional form, the liquid crystal droplets 2 would have a diameter of the order of a few microns, or a few tens of microns. With no voltage applied across the cell 1 (as shown in FIG. 1(a)) the liquid crystal director (represented by the small lines within the droplet 6) is randomly oriented and each droplet has an effective refractive index which is different to that of the host polymer. Incident radiation 7 is scattered by the droplets and the cell 1 therefore appears opaque.

When a voltage 5 is applied across the input and output faces of the cell 1 (as shown in FIG. 1(b)) the liquid crystal director 6 is oriented along the direction of the applied electric field. The PDLC material becomes transparent if the refractive index substantially matches that of the polymer. By using a suitable polymer and liquid crystal composite the cell can therefore be switched between opaque (voltage-off) and transparent (voltage-on) states. Such PDLC cells may be used in many display applications.

In the present invention, however, the diameter of the droplets 2 is reduced to significantly less than 0.1 µm, and preferably between 10 nm and 50 nm. Such a material shall be referred to as a nano phase polymer dispersed liquid crystal (PDLC) material. For a nano phase PDLC material, the scattering cross section of the droplets 2 containing non-aligned directors is negligible at visible wavelengths and the medium appears isotropic. The average refractive index of the individual droplets, however, is essentially the same as in the case of a conventional large droplet PDLC material.

The droplet size is largely determined by the wavelength region of interest. The dimensions given above would be appropriate for a filter for use in the visible spectral range. However, the droplet size may be chosen such that the filter may be used in the infrared wavelength region. Typically, the droplet diameter may be between $0.02\lambda$ and $0.12\lambda$, where $\lambda$ is the wavelength of interest.

When an electric field is applied across the cell 1, a degree of director ordering occurs along the direction of the applied electric field and therefore, for light entering the cell orthogonal to the substrate, there is a net reduction in the effective refractive index of the droplets 2. The net reduction in the effective refractive index is less for light entering the cell at some degree off the orthogonal direction.

The medium is still isotropic on the scale of the wavelength of visible light of interest and, on the basis of effective medium approximations, the refractive index of the polymer composite is correspondingly reduced by an amount related to the degree of director rotation. The director rotation is determined by the level of the applied electric field and the degree to which the rotation of the director is hindered, which depends amongst other things on the particular materials used and the level of interaction between the liquid crystal material and the host polymer.

The composite may be produced using conventional polymerisation-induced phase separation processes (PIPS) [Doane, J. W. et al, 1986, *Appl Phys Lett* 48, 269]. For example, one such process involves the mixing of a liquid crystal with a low molecular weight, fluid and transparent pre-polymer. A fluid and optically transparent solution is obtained which can be cured by ultra violet light, by adding a chemical curing agent or by heating.

As the reaction proceeds the liquid crystal gradually becomes less soluble in the forming polymer and eventually sub-micron droplets can be nucleated. At the end of the curing process the material consists of nematic droplets cast in a solid matrix. Thermally induced phase separation processes (TIPS) or solvent induced phase separation processes (SIPS) could also be used [Wu, B. G., 1987, *J Appl Phys*, 62, 3925].

Figure 2:
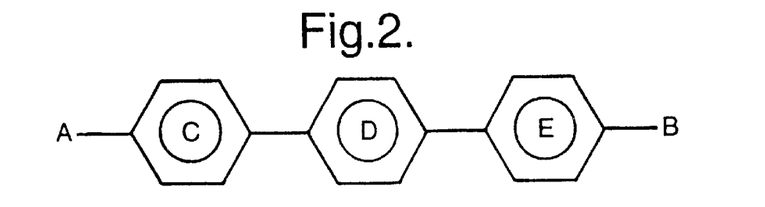
FIG. 2 shows the structure of a suitable liquid crystal material which may be used in the present invention.

Preferably, the liquid crystal material is a nematic material with the structure shown in FIG. 2. where A may be alkyl or alkoxy, and preferably containing $C_{1-12}$, any one of C, D or E may be cyclohexane or benzene and B may be cyano or one of a terminal halogenated group. Examples of suitable materials may be found in the following references; U.S. patent applications WO 89 12 621 and WO 91 09 092, and references contained therein.

For example, the nano phase PDLC material may comprise the monomer dipentaerithrytol pentahexa acrylate as the host, cross linked with 1 vinyl 2 pyrrolidinone. The liquid crystal used may be BL36, available from the E. Merck catalogue, and is dissolved in the monomer prior to curing. Darocur 4265 can be used to cure the solution in approximately 0.5 seconds, a fast curing being essential to avoid droplet aggregation.

Figure 3:
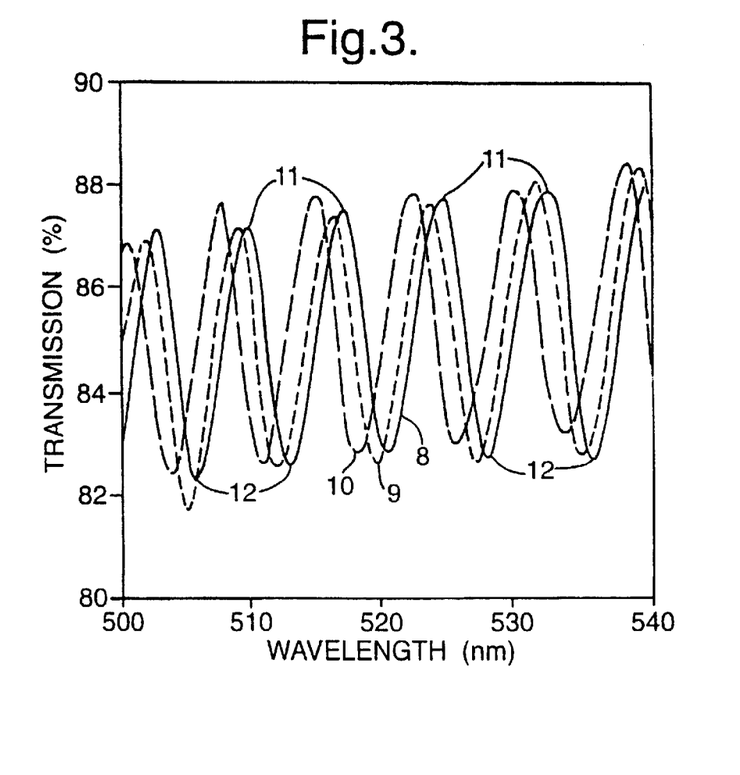
FIG. 3 shows the optical transmission spectrum, at various voltages, of a PDLC cell which may be used in the present invention, in which droplets of liquid crystal material within the host polymer have a diameter between 10 nm and 50 nm.

The optical transmission spectrum of a nano phase PDLC cell is shown in FIG. 3. The three curves 8, 9 and 10 represent the transmission-wavelength characteristic of the cell with applied fields of 0, 27 and 55 V/$\mu$m respectively. To allow interference fringes to be seen, the cell must also comprise a material with a refractive index sufficiently different to that of the PDLC material. In this example the PDLC material is 11 $\mu$m thick and is sandwiched between glass substrates which are coated with indium tin oxide (ITO), the ITO having a refractive index sufficiently different from that of the PDLC material. On application of the voltage, the maxima 11 and minima 12 in the transmission-wavelength characteristic shift to lower wavelengths, indicating a reduction in the refractive index of the material.

If at least one maximum or minimum in the transmission-wavelength characteristic is in the visible wavelength region, the tuneable filter is operable in the visible wavelength region. In this example, the magnitude of the shift is of the order of a few nm for an applied field of 55 V/$\mu$m. When the field is removed the liquid crystal directors relax back to the voltage-off orientation and the maxima and minima in the transmission-wavelength characteristic therefore revert to the wavelengths when in the voltage-off state.

The magnitude of the shift depends on a number of factors, for example the viscosity of the actual liquid crystal material chosen for the device, the cell thickness and the number density of the droplets within the PDLC material. The magnitude of the shift is also a function of the interaction between the liquid crystal material and the host polymer at the droplet interface i.e. the degree of director pinning. By introducing a surfactant, for example octanoic acid (available from the E. Merck catalogue), the latter effect may be reduced enabling lower voltages to be applied in order to produce the required wavelength shift.

By varying the voltage 5 applied across the cell 1, the transmission of the cell can therefore be varied with wavelength, and maximum or minimum transmission can be tuned for a particular wavelength of interest. The cell can therefore be operated as a tuneable filter.

Figure 4:
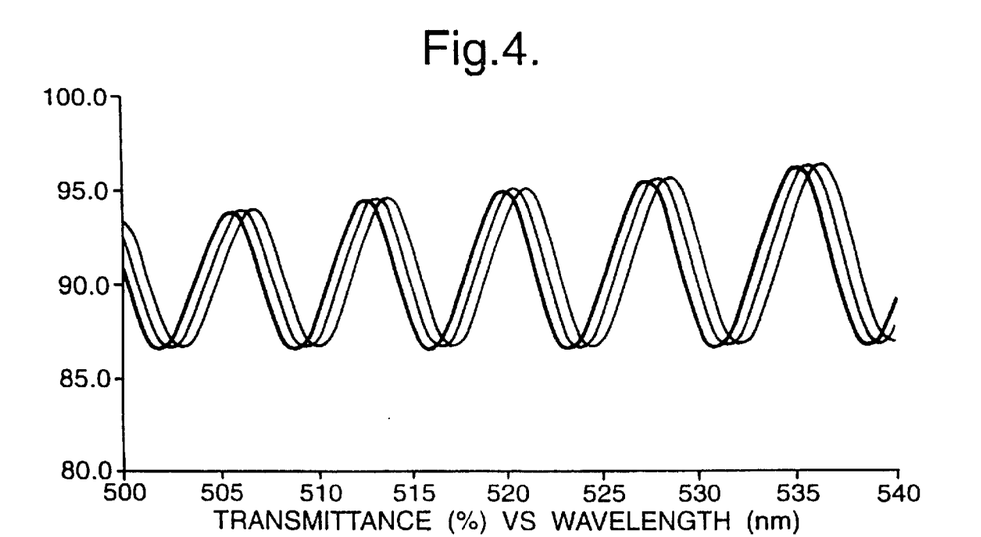
FIG. 4 shows the theoretical optical transmission-wavelength characteristic of a PDLC cell which may be used in the present invention, in which droplets of liquid crystal material within the host polymer have a diameter between 10 nm and 50 nm.

The theoretical performance of a similar multilayer stack is shown in FIG. 4, where the stack has a glass/ITO/PDLC/ITO/glass structure (as shown in FIG. 1). The data plotted assumes an ITO thickness of 100 nm and does not include the contribution due to the reflectance of the external glass-air interface and the magnitude of the theoretical transmission (FIG. 4) is therefore slightly different from the observed transmission (FIG. 3). The relative shifts of the interference fringes are similar to the observed data and are due to reductions in the refractive index from 1.65 to 1.648 to 1.646 for applied fields of 0, 27 and 55 V/$\mu$m respectively.

Figure 5:
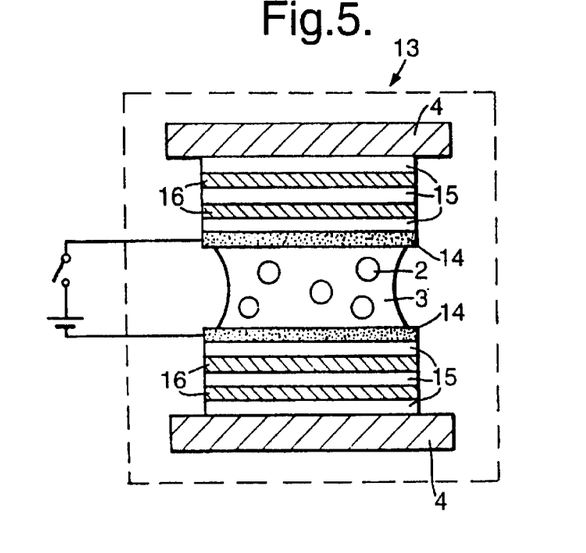
FIG. 5 shows a diagram of a Fabry Perot etalon comprising a PDLC material, dielectric layers and alternate layers of high (H) and low (L) refractive index material in a multi-layer stack configuration.

The contrast levels of the device can be significantly increased by the addition of dielectric reflecting layers around the PDLC cavity. FIG. 5 shows a resonant cavity 13 with a multilayer structure of G/HLHLH/ITO/PDLC/ITO/HLHLH/G, where G (4) are input and output facing glass substrates, ITO is the indium tin oxide layer 14 to which a voltage may be applied and H (15) and L (16) represent quarter-wave layers of material of high and low refractive index respectively (with each refractive index measured relative to the refractive index of the other). Examples of such materials are titanium oxide (H) and silicon oxide (L).

Figure 6:
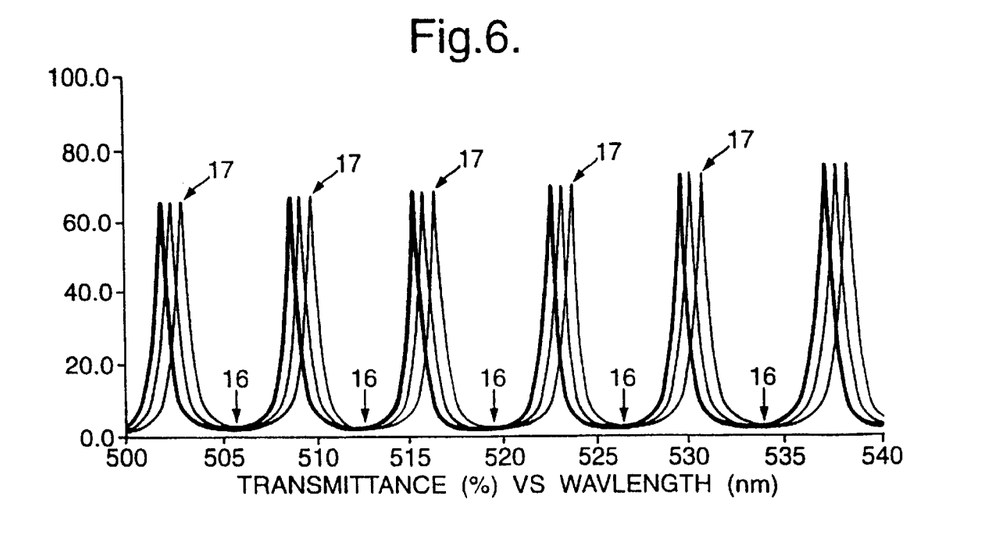
FIG. 6 shows the theoretical optical transmission-wavelength characteristic of the Fabry Perot etalon structure shown in FIG. 5.

Referring to FIG. 6, the three curves shown the theoretical optical transmission-wavelength characteristic of the etalon device shown in FIG. 5 for three different voltages applied across the etalon device 13. For this device configuration, the transmission has been reduced to only a few percent at the minima 16 and is over 60 percent at the maxima 17.

Figure 7:
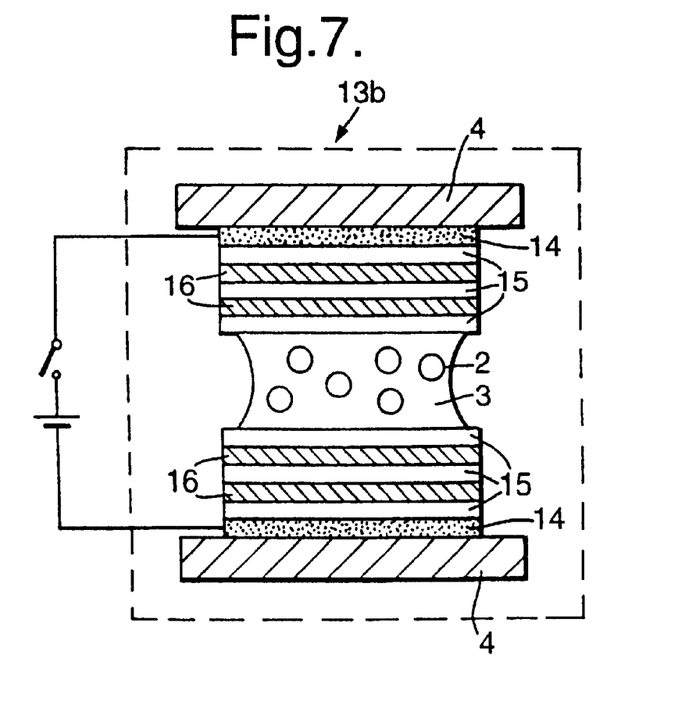
FIG. 7 shows a diagram of a Fabry-Perot etalon structure, as in FIG. 5, wherein the dielectric layers are shifted to the outside of the HL-multilayer stack.

To further improve the contrast level of the filter, the ITO layers 14 may be shifted to the outside of the stack, between the glass substrates 4 and 5 and the HLHLH layers, as shown in FIG. 7. The contrast level can also be improved by increasing the number of H and L layers in the stack.

Figure 8:
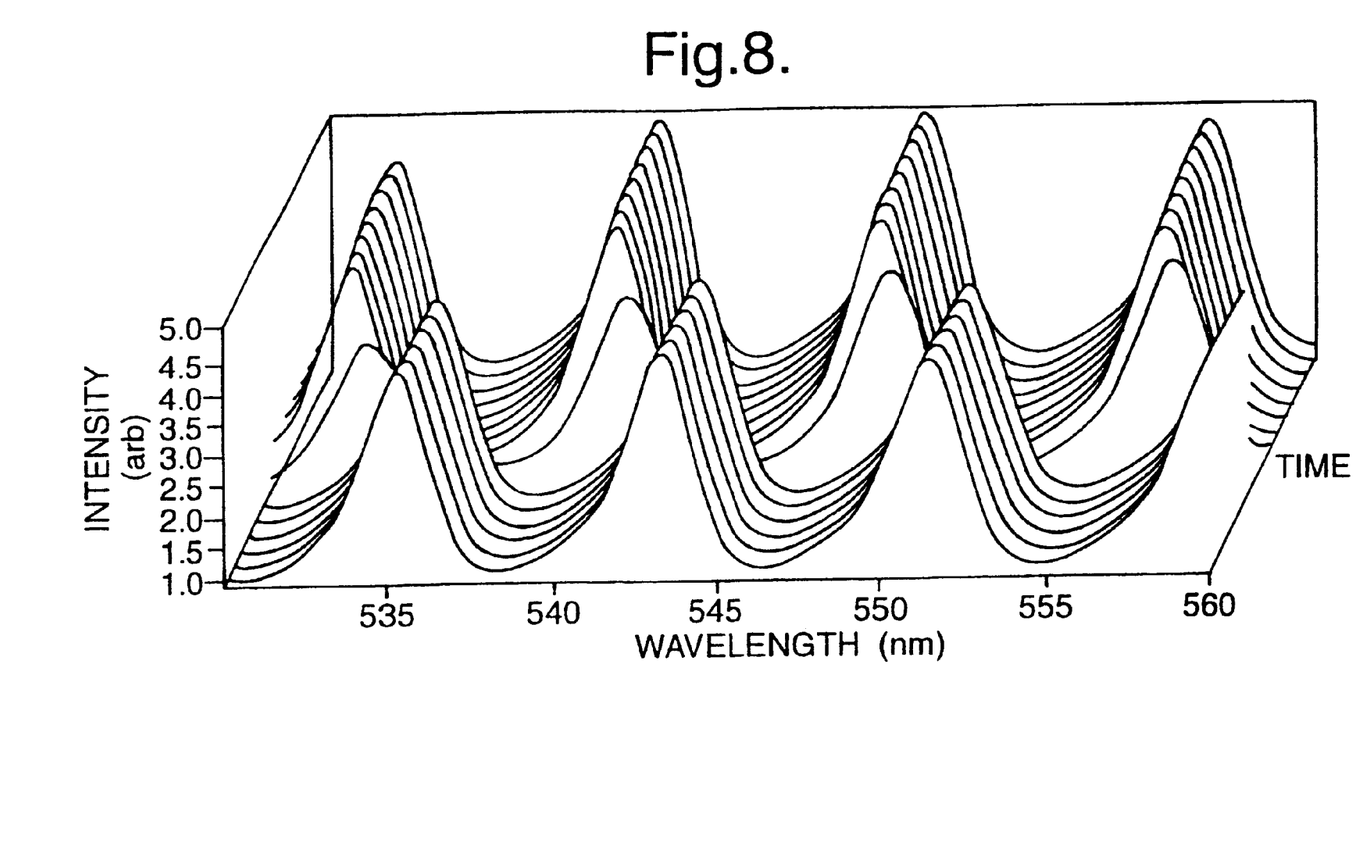
FIG. 8 shows the measured response characteristics of the Fabry Perot etalon structure indicating the achievement of contrast levels in excess of 50% and FIG. 9 shows a diagram of a Distributed Bragg Filter comprising alternate layers of indium tin oxide and PDLC material.

The measured spectral characteristics of such a device are shown in FIG. 8, which also shows the change in response as a function of time on application of an electric field. AC switching has been measured at frequencies in excess of 1 kHz in such device configurations.

Various combinations of H and L layers may be included in the etalon and arrangements need not restricted to symmetric combinations on either side of the PDLC material. For example, for certain applications it may be advantageous to have a metal reflector on one side of the PDLC material, whilst having one or more H or L layers on the other side.

Figure 9:
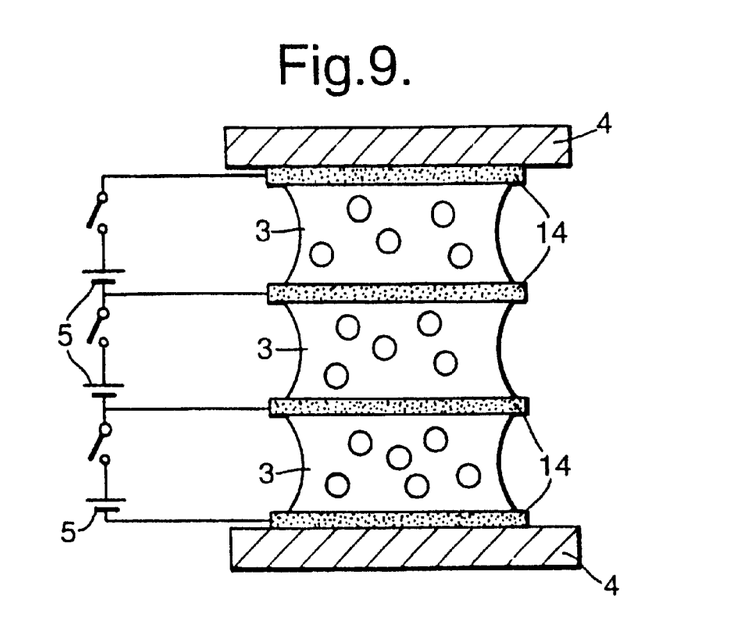

As the nano phase PDLC material fully contains the liquid crystal material, it can be produced as a free standing sheet material. In this form the material can be coated with a dielectric material, for example ITO, cut into sections and bonded or hot pressed to form a stack with the general structure (ITO/PDLC)$^n$, where n is the number of ITO/PDLC layers. Such a device is shown in FIG. 9. The device has an optically unsymmetrical design and the majority of the filter is comprised of PDLC material.

A PDLC material is practical for use as a tuneable filter as it can be produced as a sheet material and cut into the desired section for the particular application. For display purposes, the material can be used in flexible or compound configurations.

Provided that the individual PDLC layers can be phase matched on assembly, the structure can be used as a practical tuneable filter. The advantage of using ITO for the high refractive index layer is that a variable voltage 5 may be applied across each PDLC layer, with each voltage having an independent control. This enables fine tuning of the individual voltages to achieve optimum phase matching in the structure. Typically, for use at visible wavelengths, the thickness of each PDLC layer is 11 $\mu$m, with an ITO thickness of approximately 70 nm. Other thin layers may be incorporated adjacent to the ITO layers to enhance the refractive index contrast.

The filter described above comprises a nano phase PDLC material sample but other composite materials which are polarisable by means of an applied electric field may also be used. For example, other suitable materials include methyl nitro aniline (MNA), 2-($\alpha$-methyl benzylamino)-5-nitropyridene (MBANP) or lead lanthanum zirconate titanate (PLZT).

The tuneable filter may be of particular importance as an electro-optic protection device. As the device is transparent in both the voltage-on and voltage-off states, it does not significantly obscure vision and may therefore be incorporated within imaging equipment or viewing aids. For example the device may be used in front of binoculars or protective glasses as a means of protecting against laser radiation. The filter may be manually tuned by an operator or may be arranged to be operated automatically. For example, the voltage applied to the filter may be controlled by feedback from a laser radiation detector such that the maximum attenuation of radiation is achieved.

The filter may also be used in high contrast displays where it may be used to modulate the transmitted intensities of the primary colours used to form images. Either projection or back-lit formats are possible. The degree of contrast is independent of the need for any polariser and is defined by the design of optical cavity used in the filter stack. The filter may also be used at infrared wavelengths, for wavelength division multiplexing in communication applications

What is claimed is:

1. A tuneable filter having a transmission-wavelength characteristic with at least one maximum or minimum comprising:
   at least one resonant cavity;
   a plurality of layers of nano phase polymer dispersed liquid crystal (PDLC) material contained within and forming part of said resonant cavity, wherein the PDLC material is polarisable by means of an applied electric field,
   at least one layer of dielectric material on each side of the PDLC material, said dielectric material having a refractive index different from that of the PDLC material, and
   means for applying a variable electric field across the PDLC material,
   wherein variation of the electric field applied across the PDLC material gives rise to variation of the wavelengths at which the maximum or minimum occurs in the transmission-wavelength characteristic, wherein the filter comprises alternate layers of a transparent dielectric material and the PDLC material substantially parallel to each other.

2. A tuneable filter of claim 1 and further comprising means for applying an independent voltage to each individual transparent dielectric material layer.

3. A tuneable filter of claim 2 wherein said transparent dielectric material is comprised of a layer of indium tin oxide.

4. A tuneable filter of claim 2 wherein said means for applying includes independantly varying the voltage applied to each transparent dielectric material layer.

5. A tuneable filter of claim 1 wherein said transparent dielectric material is comprised of a layer of indium tin oxide.

6. A tuneable filter having a transmission-wavelength characteristic with at least one maximum or minimum comprising:
   a resonant cavity;
   a layer of nano phase polymer dispersed liquid crystal (PDLC) material contained within and forming part of said resonant cavity, wherein the PDLC material is polarisable by means of an applied electric field;
   at least one layer of dielectric material on each side of the PDLC material, said dielectric material having a refractive index different from that of the PDLC material; and
   electrodes across at least a portion of said PDLC material and a variable source of voltage applied to said electrodes to apply a variable electric field across the PDLC material,
   wherein variation of the electric field applied across the PDLC material gives rise to variation of the wavelengths at which the maximum or minimum occurs in the transmission-wavelength characteristic.

7. A tuneable filter having a transmission-wavelength characteristic with at least one maximum or minimum comprising:
   a stack of at least two phase matched resonant cavities;
   a layer of nano phase polymer dispersed liquid crystal (PDLC) material contained within and forming part of each of said resonant cavities, wherein the PDLC material is polarisable by means of an applied electric field,
   at least one layer of dielectric material on each side of the PDLC material, said dielectric material having a refractive index different from that of the PDLC material and
   means for applying a variable electric field across the PDLC material in each of said resonant cavities,
   wherein variation of the electric field applied across the PDLC material gives rise to variation of the wavelengths at which the maximum or minimum occurs in the transmission-wavelength characteristic.

8. A tunable filter according to claim 7, wherein said at least two resonant cavities comprises at least three resonant cavities.

9. A tunable filter according to claim 7, wherein said means for applying includes means for applying separate electric fields across the PDLC material in each of the at least two resonant cavities.

10. A tunable filter according to claim 7, wherein the PDLC material is comprised of nematic liquid crystal material.

11. A tunable filter according to claim 10, for use in a wavelength region including a wavelength $\lambda$, wherein droplets of liquid crystal material within the PDLC material have a diameter of between $0.02\lambda$ and $0.12\lambda$.

12. A tuneable filter according to claim 11, wherein droplets of liquid crystal material within the PDLC material have a diameter of less than $0.1\ \mu m$.

13. A tuneable filter according to claim 12, wherein droplets of liquid crystal material within the PDLC material have a diameter of between 10 nm and 50 nm.

14. A tunable filter according to claim 7, wherein the resonant cavities have locally substantially parallel facing input and output substrates.

15. A tunable filter according to claim 7, wherein the transmission-wavelength characteristic has a plurality of maxima and minima.

16. A tunable filter according to claim 7, wherein at least one maximum or minimum in the transmission-wavelength characteristic is in the visible or near infrared wavelength region.

17. A tunable filter according to claim 7, wherein the dielectric material is indium tin oxide (ITO) and said ITO forms an electrode to which the variable electric field may be applied.

18. A tunable filter according to claim 7, and also including at least one layer of material of high (H) or low (L) refractive index.

19. A tunable filter according to claim 18, wherein layers of H and L material are arranged in an alternate HL layer structure.

20. A tunable filter according to claim 18, wherein the material of high refractive index is titanium oxide and the material of low refractive index is silicon oxide.

21. A tunable filter according to claim 7, wherein the filter comprises alternate layers of ITO and the PDLC material substantially parallel to each other.

22. A tunable filter according to claim 21, and further comprising means for applying an independent voltage to each individual ITO layer.

23. A tuneable filter having a transmission-wavelength characteristic with at least one maximum or minimum comprising:
   a stack of at least two phase matched resonant cavities;
   a layer of nano phase polymer dispersed liquid crystal (PDLC) material contained within and forming part of each of said resonant cavities, wherein the PDLC material is polarisable by means of an applied electric field,
   at least one layer of dielectric material on each side of the PDLC material, said dielectric material having a refractive index different from that of the PDLC material and a source of variable electric field connected across the PDLC material in each of said resonant cavities, wherein variation of the electric field applied across the PDLC material gives rise to variation of the wavelengths at which the maximum or minimum occurs in the transmission-wavelength characteristic.

24. A tunable filter according to claim 23, herein said at least two resonant cavities comprises at least three resonant cavities.

25. A tunable filter according to claim 23, herein said source includes separate sources of electric fields connected across the PDLC material in each of the at least two resonant cavities.

26. A tunable filter according to claim 23, wherein the PDLC material is comprised of nematic liquid crystal material.

27. A tunable filter according to claim 26, for use in a wavelength region including a wavelength $\lambda$, wherein droplets of liquid crystal material within the PDLC material have a diameter of between $0.02\lambda$ and $0.12\lambda$.

28. A tunable filter according to claim 27, wherein droplets of liquid crystal material within the PDLC material have a diameter of less than 0.1 $\mu$m.

29. A tunable filter according to claim 28, wherein droplets of liquid crystal material within the PDLC material have a diameter of between 10 nm and 50 nm.

30. A tunable filter according to claim 23, wherein the resonant cavities have locally substantially parallel facing input and output substrates.

31. A tunable filter according to claim 23, wherein the transmission-wavelength characteristic has a plurality of maxima and minima.

32. A tunable filter according to claim 23, wherein at least one maximum or minimum in the transmission-wavelength characteristic is in the visible or near infrared wavelength region.

33. A tunable filter according to claim 23, wherein the dielectric material is indium tin oxide (ITO) and said ITO forms an electrode to which the variable electric field may be applied.

34. A tunable filter according to claim 23, and also including at least one layer of material of high (H) or low (L) refractive index.

35. A tunable filter according to claim 34, wherein layers of H and L material are arranged in an alternate HL layer structure.

36. A tunable filter according to claim 35, wherein the material of high refractive index is titanium oxide and the material of low refractive index is silicon oxide.

37. A tunable filter according to claim 23, wherein the filter comprises alternate layers of ITO and the PDLC material substantially parallel to each other.

38. A tunable filter according to claim 37, and further comprising means for applying an independent voltage to each individual ITO layer.

39. A tuneable filter having a transmission-wavelength characteristic with at least one maximum or minimum comprising:

at least one resonant cavity;

a plurality of layers of nano phase polymer dispersed liquid crystal (PDLC) material contained within and forming part of said resonant cavity, wherein the PDLC material is polarisable by means of an applied electric field, at least one layer of dielectric material on each side of the PDLC material, said dielectric material having a refractive index different from that of the PDLC material, and means for applying a variable electric field across the PDLC material, said means for applying comprising at least two substantially transparent electrode layers, wherein variation of the electric field applied across the PDLC material gives rise to variation of the wavelengths at which the maximum or minimum occurs in the transmission-wavelength characteristic.

40. A tuneable filter according to claim 39, wherein said substantially transparent electrodes are adjacent each said PDLC material layer.

41. A tuneable filter according to claim 39, wherein said substantially transparent electrodes sandwich said PDLC material layer and said dielectric layers.

42. A tuneable filter having a transmission-wavelength characteristic with at least one maximum or minimum comprising:

at least one resonant cavity;

at least one layer of nano phase polymer dispersed liquid crystal (PDLC) material contained within and forming part of said resonant cavity, wherein the PDLC material is polarisable by means of an applied electric field, at least two layers of dielectric material on each side of said at least one layer of PDLC material, said dielectric material having a refractive index different from that of the PDLC material, and means for applying a variable electric field across the PDLC material, wherein variation of the electric field applied across the PDLC material gives rise to variation of the wavelengths at which the maximum or minimum occurs in the transmission-wavelength characteristic.

\* \* \* \* \*